(12) United States Patent
Takayama et al.

(10) Patent No.: US 11,855,503 B2
(45) Date of Patent: Dec. 26, 2023

(54) MOTOR-DRIVEN COMPRESSOR

(71) Applicant: KABUSHIKI KAISHA TOYOTA JIDOSHOKKI, Kariya (JP)

(72) Inventors: Hiroki Takayama, Kariya (JP); Shozo Hamana, Kariya (JP); Taku Adaniya, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 421 days.

(21) Appl. No.: 17/029,653

(22) Filed: Sep. 23, 2020

(65) Prior Publication Data

US 2021/0099042 A1 Apr. 1, 2021

(30) Foreign Application Priority Data

Sep. 27, 2019 (JP) .................................. 2019-178105

(51) Int. Cl.
*H02K 3/50* (2006.01)
*H01R 9/22* (2006.01)
*H01R 9/24* (2006.01)
*H02K 11/33* (2016.01)
*F25B 31/02* (2006.01)
*F04D 25/06* (2006.01)
(Continued)

(52) U.S. Cl.
CPC ............. *H02K 3/50* (2013.01); *F04C 23/008* (2013.01); *F04D 25/0693* (2013.01); *F25B 31/026* (2013.01); *H01R 9/223* (2013.01); *H01R 9/24* (2013.01); *H02K 3/38* (2013.01); *H02K 11/33* (2016.01); *F04C 2240/803* (2013.01); *H01R 2201/10* (2013.01)

(58) Field of Classification Search
CPC ................ F04C 18/0215; F04C 23/008; F04C 2240/803; F04C 2240/808; F04D 25/0693; F25B 31/026; H01R 9/223; H01R 9/24; H01R 13/424; H01R 13/52; H01R 13/533; H01R 13/5825; H01R 2201/10; H02K 3/38; H02K 3/50; H02K 5/225; H02K 11/33

See application file for complete search history.

(56) References Cited

U.S. PATENT DOCUMENTS 4,717,359 A * 1/1988 Rahrig ................. H01R 13/422
439/942
4,898,548 A * 2/1990 Case .................... H01R 13/424
439/598

(Continued)

FOREIGN PATENT DOCUMENTS

JP 5944169 B2 7/2016

*Primary Examiner* — Charles G Freay
*Assistant Examiner* — Joseph S. Herrmann
(74) *Attorney, Agent, or Firm* — Sughrue Mion, PLLC

(57) ABSTRACT

A motor-driven compressor includes a plurality of motor wires and an insulating terminal container. The motor wires include portions covered with an insulating tube and distal ends at which a connection terminal is provided. The terminal container includes a cluster block and a terminal holder. The cluster block accommodates the connection terminal and has an opening. The terminal holder holds the connection terminal and has a lid that closes the opening. The cluster block includes a base portion. The lid has a cutout that receives the tube. The lid is in contact with the base portion such that a part of a hole defined by the cutout is closed by the base portion.

9 Claims, 6 Drawing Sheets

(51) Int. Cl.
*H02K 3/38* (2006.01)
*F04C 23/00* (2006.01)

(56) References Cited

U.S. PATENT DOCUMENTS

| | | | | |
|---|---|---|---|---|
| 4,966,559 | A * | 10/1990 | Wisner | H02K 11/40 |
| | | | | 174/541 |
| 5,830,010 | A * | 11/1998 | Miskin | H01R 13/65912 |
| | | | | 439/578 |
| 6,910,904 | B2 * | 6/2005 | Herrick | F04C 23/008 |
| | | | | 439/942 |
| 9,590,462 | B2 * | 3/2017 | Kobayashi | H02K 11/33 |
| 2014/0375157 | A1 * | 12/2014 | Taguchi | H02K 3/44 |
| | | | | 310/71 |
| 2015/0214805 | A1 * | 7/2015 | Kobayashi | F04B 39/121 |
| | | | | 310/71 |
| 2015/0303762 | A1 * | 10/2015 | Hagita | H02K 15/14 |
| | | | | 310/71 |

* cited by examiner

MOTOR-DRIVEN COMPRESSOR

BACKGROUND

1. Field

The present disclosure relates to a motor-driven compressor.

2. Description of Related Art

A motor-driven compressor includes a compressing unit, which compresses a refrigerant, an electric motor, which drives the compressing unit, a motor drive circuit, which drives the electric motor, conductors, which are electrically connected to the motor drive circuit, and motor wires routed out of the electric motor. The motor-driven compressor also includes connection terminals, which electrically connect the motor wires and the conductors to each other, an insulating terminal container, which accommodates the connection terminals, and a housing, which accommodates the compressing unit, the electric motor, and the terminal container. The terminal container has a cluster block, which accommodates the connection terminals.

Refrigerant contains lubricant for improving lubrication of sliding parts (for example, a compression mechanism) in the motor-driven compressor. Refrigerant may electrically connect the connection terminals and the housing to each other. Therefore, a seal member restricts entry of refrigerant into the cluster block.

For example, Japanese Patent No. 5944169 discloses a motor-driven compressor that includes motor leads, which are motor wires. The distal ends of the motor leads are exposed. Except for the distal ends, the motor leads are covered with tubes. The motor leads are connected to connector terminals, which are connection terminals, via vacuum drawing passages. The vacuum drawing passages are formed by the gaps of the lead bundles in the exposed distal ends. The inside of the connector housing, which is a cluster block, is connected to the outside through the vacuum drawing passages.

A rubber seal member is disposed in the clearance between the motor leads and the connector housing. That is, the clearance between the motor leads and the connector housing is closed by the seal member. Refrigerant and lubricant are allowed to flow into the connector housing only through the vacuum drawing passages.

The motor leads are press-fitted into the seal member. The connector terminals are inserted into the connector housing. The seal member is press-fitted into the connector housing. The outer surface of the seal member is in close contact with the inner surface of the connector housing. The process for press-fitting the seal member into the connector housing is not easy. During the press-fitting process, the seal member is deformed in some cases. In other cases, the position of the sealing member relative to the motor leads is displaced. This may reduce the sealing performance of the seal member.

SUMMARY

It is an objective of the present disclosure to provide a motor-driven compressor that facilitates a process for ensuring sealing performance at a circumferential surface of a tube, and limits reduction in the sealing performance.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a motor-driven compressor is provided that includes a compressing unit configured to compress a refrigerant, an electric motor configured to drive the compressing unit, a motor drive circuit configured to drive the electric motor, a plurality of motor wires electrically connected to the electric motor, an insulating terminal container, and a housing. The motor wires include portions covered with an insulating tube and distal ends at which a connection terminal is provided. The connection terminal is electrically connected to the motor drive circuit. The housing accommodates the compressing unit, the electric motor, and the terminal container. The terminal container includes a cluster block that accommodates the connection terminal and has an opening that opens to an outside, and a terminal holder that holds the connection terminal, the terminal holder having a lid that closes the opening. The cluster block includes a base portion, the base portion having a guide recess arranged to guide the tube. The base portion defines a space that is continuous with the opening in the cluster block. The lid includes a cutout that receives the tube. The lid is in contact with the base portion such that a part of a hole defined by the cutout is closed by the base portion.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A motor-driven compressor 10 according to an embodiment will now be described with reference to FIGS. 1 to 10.

Figure 1:
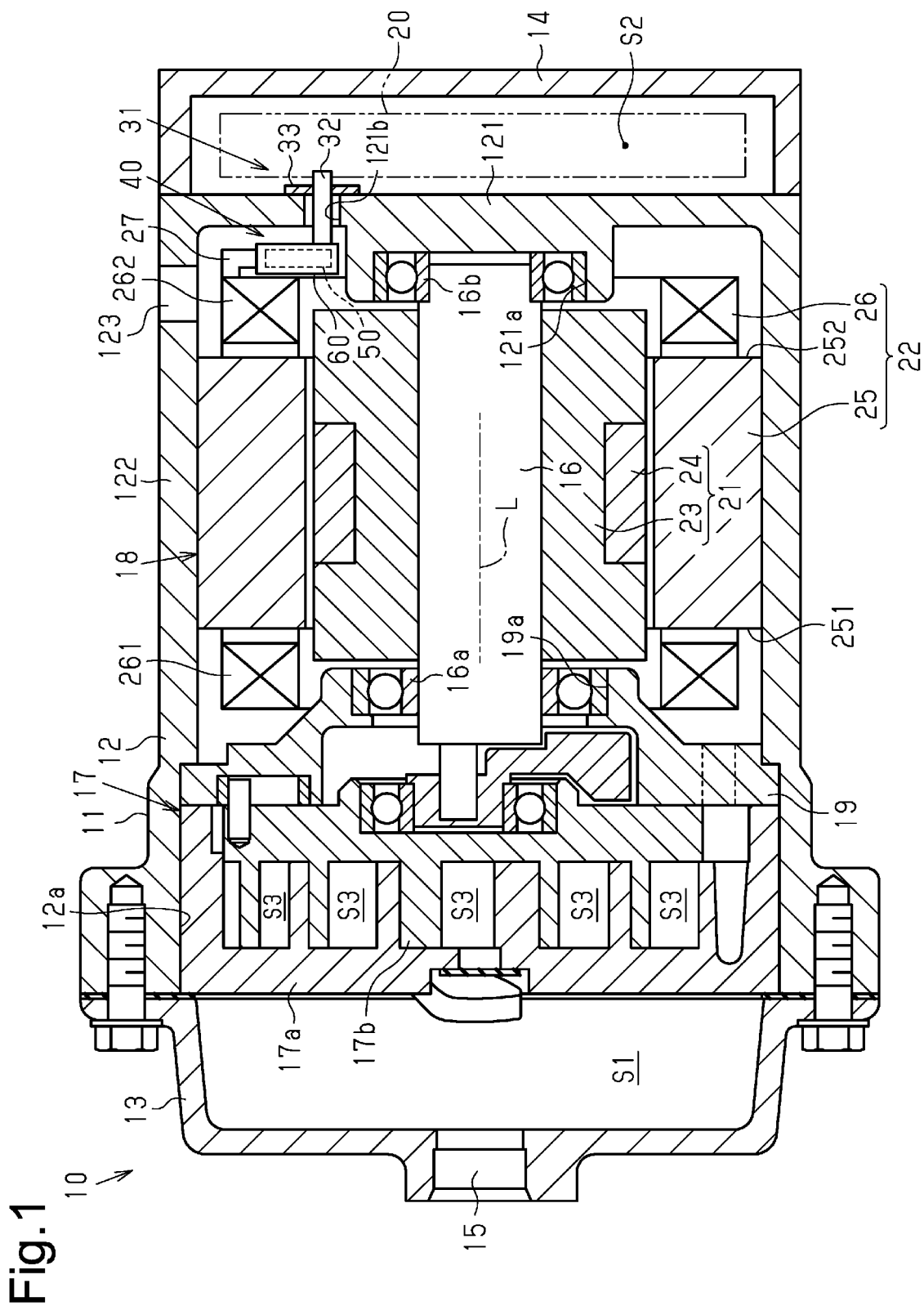
FIG. 1 is a cross-sectional side view of a motor-driven compressor according to an embodiment.

As shown in FIG. 1, a housing 11 of the motor-driven compressor 10 includes a motor housing member 12, which includes a peripheral wall 122, a discharge housing member 13, and an inverter cover 14, which includes a peripheral wall. The motor housing member 12 includes an opening 12a, which is open at a first end (the left end in FIG. 1) of the peripheral wall 122, and an end plate 121, which is a second end of the peripheral wall 122. The discharge housing member 13 includes a peripheral wall and an end wall, which closes a first end (the left end in FIG. 1) of the peripheral wall. The peripheral wall of the discharge housing member 13 includes a second end, which is an open end continuous with the opening 12a of the motor housing member 12. The inverter cover 14 has an open end, which is a first end (the left end in FIG. 1) attached to the end plate 121. The inverter cover 14 has a second end, which is an end wall. The motor housing member 12 and the discharge housing member 13 define a discharge chamber S1 in between. The discharge housing member 13 has a discharge port 15, which opens in the end wall. The discharge port 15 is connected to an external refrigerant circuit (not shown). The peripheral wall 122 of the motor housing member 12 has a suction port 123, which is connected to the external refrigerant circuit (not shown).

The motor housing member 12 accommodates a rotary shaft 16. The motor housing member 12 also accommodates a compressing unit 17, which compresses refrigerant, and an electric motor 18, which drives the compressing unit 17. The electric motor 18 drives the rotary shaft 16. When the rotary shaft 16 operates, the compressing unit 17 is driven. In the motor housing member 12, the electric motor 18 is arranged to be closer to the end plate 121 than the compressing unit 17 (toward the right in FIG. 1).

In the motor housing member 12, a shaft supporting member 19 is provided between the compressing unit 17 and the electric motor 18. The shaft supporting member 19 has a receiving hole 19a at the center, through which a first end (the left end in FIG. 1) of the rotary shaft 16 extends. A radial bearing 16a is provided between the receiving hole 19a and the first end of the rotary shaft 16. The first end of the rotary shaft 16 is rotationally supported by the shaft supporting member 19 with the radial bearing 16a.

The end plate 121 includes a bearing unit 121a. The bearing unit 121a accommodates a second end of the rotary shaft 16. A radial bearing 16b is provided between the bearing unit 121a and the second end of the rotary shaft 16. The second end of the rotary shaft 16 is rotationally supported by the bearing unit 121a with the radial bearing 16b.

The end plate 121 and the inverter cover 14 define an accommodation space S2. In the accommodation space S2, a motor drive circuit 20 is attached to the outer surface of the end plate 121, that is, the end face that is in contact with the inverter cover 14. In the present embodiment, the compressing unit 17, the electric motor 18, and the motor drive circuit 20 are arranged in the order in a direction in which the axis L of the rotary shaft 16 extends (axial direction).

The compressing unit 17 includes a stationary scroll 17a, which is fixed in the motor housing member 12, and a movable scroll 17b, which is disposed to be opposed to the stationary scroll 17a. Compression chambers S3, the volume of which is variable, are defined between the stationary scroll 17a and the movable scroll 17b. Changes in the volumes of the compression chambers S3 compress refrigerant, which is then discharged to the discharge chamber S1. The refrigerant, which flows through the motor housing member 12, the compression chambers S3, and the discharge chamber S1, contains lubricant for improving lubrication of sliding parts in the motor-driven compressor 10.

The electric motor 18 includes a rotor 21, which rotates integrally with the rotary shaft 16, and a stator 22, which is secured to the inner circumferential surface of the motor housing member 12 to surround the rotor 21.

The rotor 21 includes a cylindrical rotor core 23. The rotor core 23 is secured to the rotary shaft 16. Permanent magnets 24 are embedded in the rotor core 23. The permanent magnets 24 are arranged at equal pitches in the circumferential direction of the rotor core 23. The stator 22 includes an annular stator core 25, which is fixed to the inner circumferential surface of the motor housing member 12, and coils 26 of U, V, and W phases provided on the stator core 25.

The stator core 25 has a first end face 251, from which first coil ends 261 of the three phases protrude. The stator core 25 also has a second end face 252, from which second coil ends 262 of the three phases protrude. The first coil ends 261 protrude toward the compressing unit 17. The second coil ends 262 protrude toward the motor drive circuit 20.

Two motor wires 27 are routed out of the first coil end 261 of each phase. The coils 26 of the U, V, and W phases each have a double-wire structure, in which two leads are wound in order to reduce the voltage. FIG. 1 shows only one of the motor wires 27 of the U-phase as an example. The motor wires 27 are the leads of the coils 26 that are routed out from the second coil ends 262 in a state of being coated with insulating coating.

The end plate 121 has a hole 121b, which extends in the axial direction through the end plate 121. A hermetic terminal 31 is disposed in the hole 121b. The hermetic terminal 31 includes three conductors 32 (only one is shown in FIG. 1), which respectively correspond to the coils of the U, V, and W phases. Each conductor 32 is a columnar metal terminal that extends linearly. Each conductor 32 has a first end, which protrudes from the hole 121b into the accommodation space S2. The first end of each conductor 32 is electrically connected to the motor drive circuit 20. Each conductor 32 has a second end, which protrudes from the hole 121b into the motor housing member 12. The hermetic terminal 31 includes three insulation members 33 (only one is shown in FIG. 1), which fixes the conductors 32 to the end plate 121 while insulating the conductors 32 from the end plate 121.

The motor housing member 12 accommodates a connector 40, which connects the motor wires 27 and the second ends of the conductors 32 to each other. The connector 40 is arranged between the electric motor 18 and the end plate 121 in the axial direction.

Figure 2:
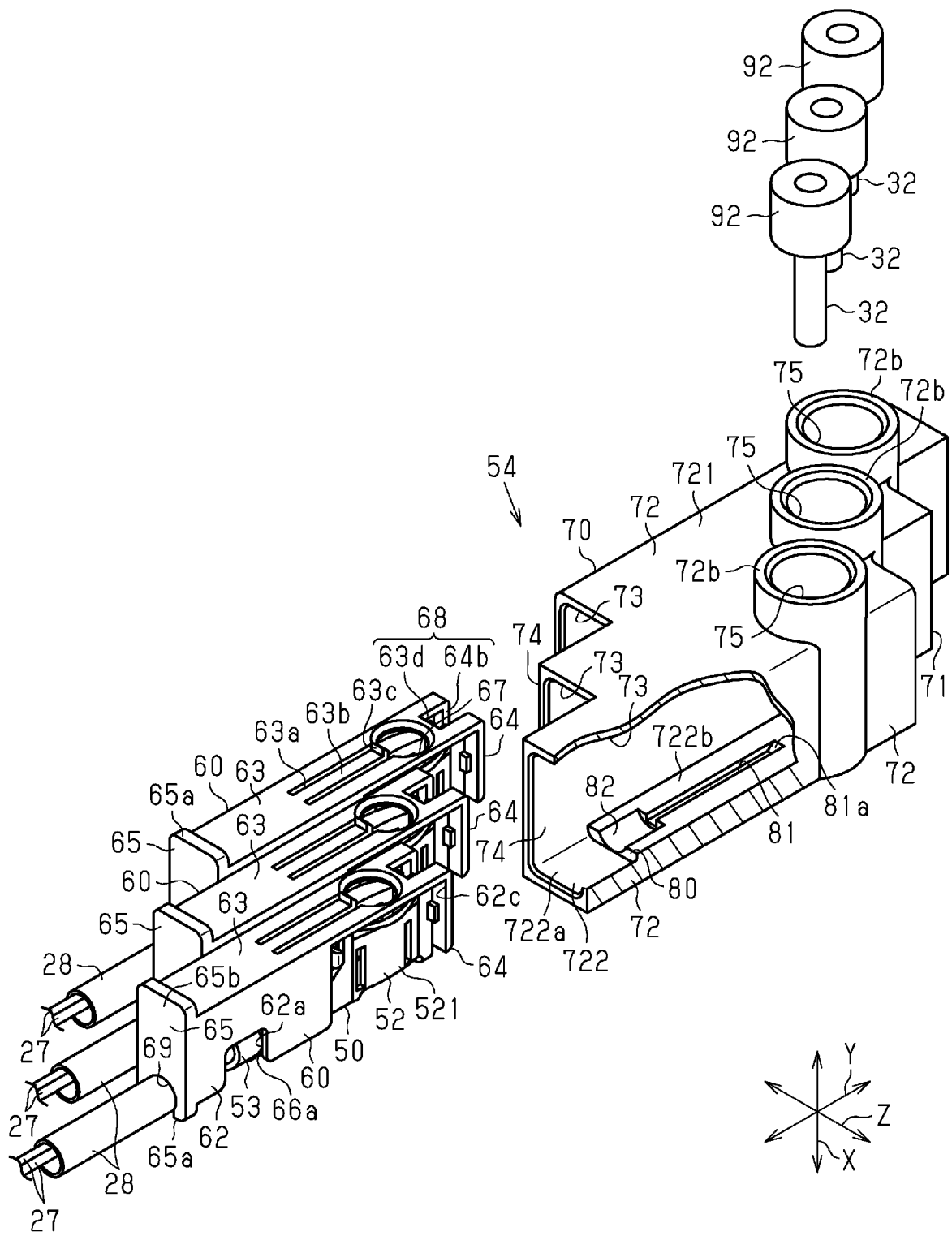
FIG. 2 is an exploded perspective view of a connector in the motor-driven compressor of FIG. 1.

The connector 40 includes three connection terminals 50 and an insulating terminal container 54, which are shown in FIG. 2. The connection terminals 50 respectively correspond to the coils 26 of the U, V, and W phases. The terminal container 54 accommodates the three connection terminals 50. The terminal container 54 includes a cluster block 70, which accommodates the three connection terminals 50, and three terminal holders 60, which respectively hold the three connection terminals 50.

Figure 3:
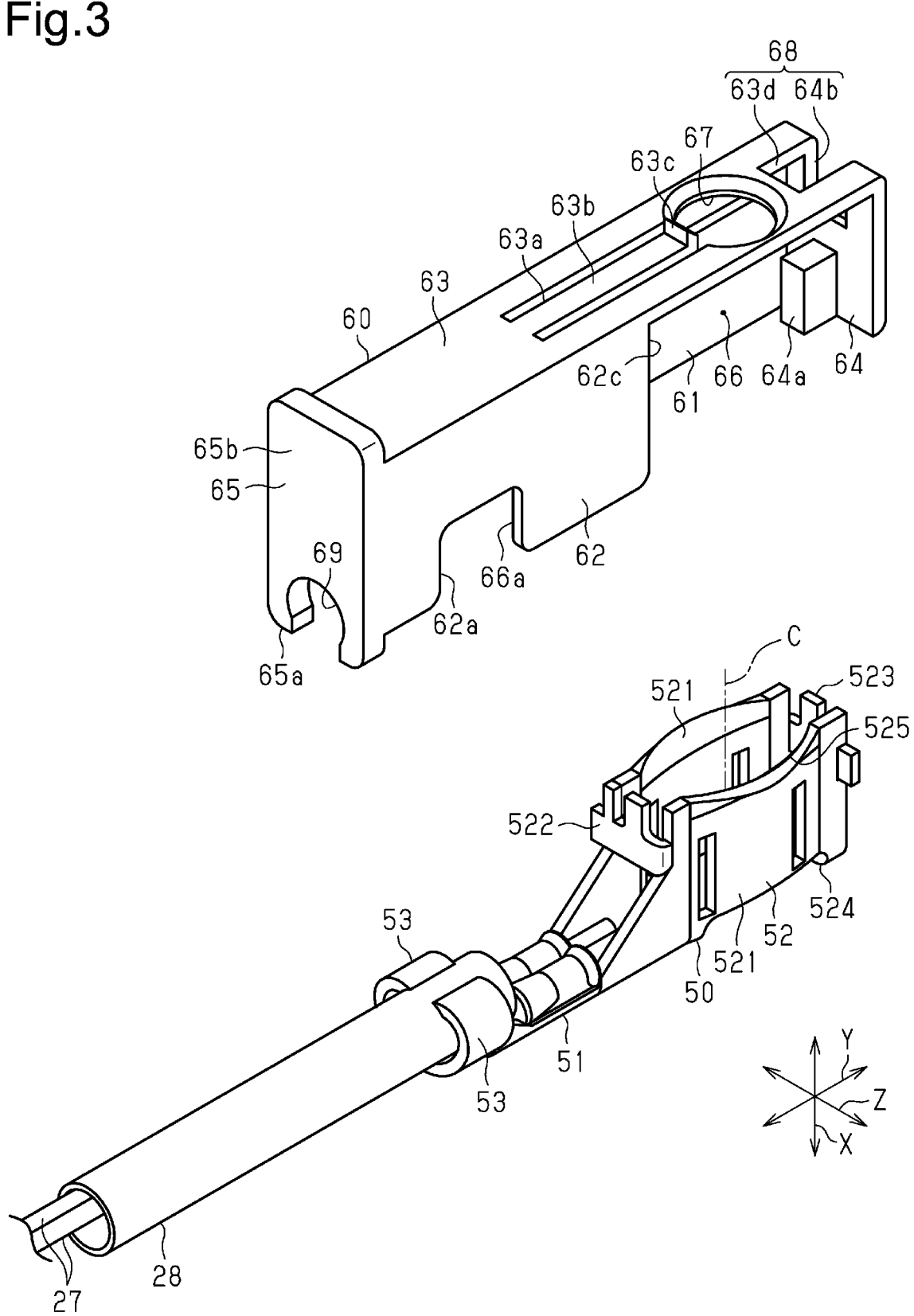
FIG. 3 is a perspective view of a connection terminal and a terminal holder in the connector of FIG. 2.
Figure 5:
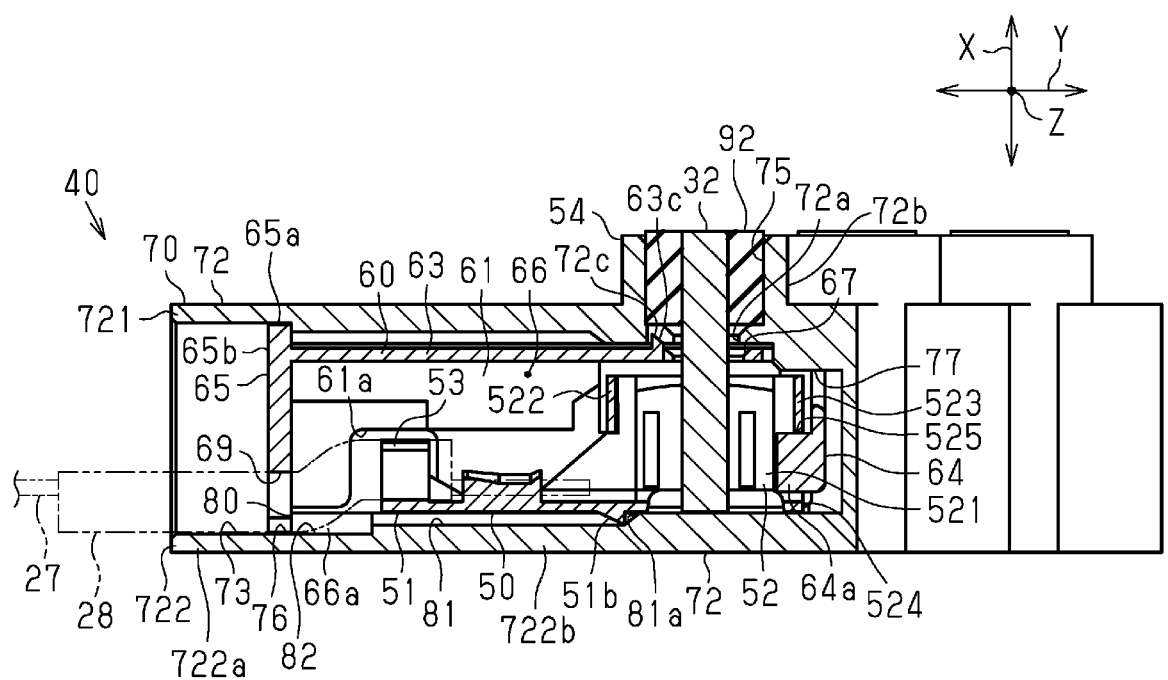
FIG. 5 is a cross-sectional view of the connector of FIG. 2.

The cluster block 70 has three openings for accommodating the three terminal holders 60. The three terminal holders 60 are configured to be accommodated in the cluster block 70 through the corresponding openings. In FIGS. 2, 3 and 5, the direction in which the conductors 32 extend is represented by an X-axis (X-direction), the longitudinal direction of the connection terminals 50 is represented by a Y-axis (Y-direction), and a direction orthogonal to the X-axis and the Y-axis is represented by a Z-axis (Z-direction). The direction in which the terminal holders 60 are inserted in to the cluster block 70 is the Y-direction. The longitudinal direction of the terminal holders 60 and the cluster block 70 is parallel with the Y-axis. Since the three connection terminals 50 have the same structure, one of the connection terminals 50 will be described.

As shown in FIG. 3, the connection terminal 50 includes a first connection portion 51 and a second connection portion 52, which is electrically connected to the conductor 32. The first connection portion 51, for example, has the shape of a rectangular plate. The motor wires 27 of each phase are electrically connected to the corresponding first connection portion 51. The distal ends of two motor wires 27 are connected to the first connection portion 51. The two motor wires 27 are passed through a cylindrical insulating tube 28. That is, each tube 28 covers two motor wires 27. The two motor wires 27 therefore have covered portions, which are covered with the insulating tube 28. The connection terminal 50, which is electrically connected to the motor drive circuit 20, is provided at the distal ends of the two motor wires 27.

The distal ends of the motor wires 27 are not covered with the tube 28, and the insulating coating is removed, so that the leads are exposed. The inner diameter of the tube 28 is greater than twice the diameter of the motor wire 27. A clearance thus exists between the two motor wires 27 and the inner circumferential surface of the tube 28.

The connection terminal 50 includes a crimp portion 53. The distal end (first end) of the tube 28 is crimped by the crimp portion 53 together with the two motor wires 27 in the tube 28. The first connection portion 51 has two long sides extending along the Y-axis. The crimp portion 53 is located at the distal end in the Y-direction of the first connection portion 51 (the end contacting the tube 28). The crimp portion 53 extends from the two long sides of the first connection portion 51 to surround the tube 28. The two motor wires 27 are crimped by the crimp portion 53 in a state of being passed through the tube 28. Accordingly, the two motor wires 27 are mechanically connected to the connection terminal 50. The connection terminal 50 includes a hook portion 51b, which protrudes in the X-direction from the proximal end in the Y-direction of the first connection portion 51. The hook portion 51b is located at the center in the Z-direction of the first connection portion 51.

The second connection portion 52 is continuous with the proximal end of the first connection portion 51. The second connection portion 52 includes first and second long side walls 521 and a second short side wall 523. The first and second long side walls 521 extend along the Y-axis from the two long sides of the first connection portion 51. The first and second long side walls 521 have first ends in the longitudinal direction (Y-direction), and the first short side wall 522 extends between these first ends. The second short side wall 523 extends between second ends in the longitudinal direction of the first and second long side walls 521.

The second connection portion 52 has an axis C, which extends along the X-axis and is orthogonal to the longitudinal direction of the first connection portion 51 (Y-axis). The first and second long side walls 521, the first and second long side walls 521, and the second short side wall 523 form a rectangular frame. The second end of the conductor 32 is inserted into the rectangular frame. The conductor 32 is inserted into the second connection portion 52 of the connection terminal 50 in a first direction along the X-axis (downward in FIG. 2).

The longitudinal direction of the first short side wall 522 and the second short side wall 523 are the Z-direction. The first short side wall 522 and the second short side wall 523 are opposed to each other in the Y-direction. The first connection portion 51, the first short side wall 522, and the second short side wall 523 are arranged in the order along the Y-axis.

The second connection portion 52 includes an end side wall 524, which extends between the second ends of the first and second long side walls 521. The long sides of the end side wall 524 extend along the Z-axis, and the short sides of the end side wall 524 extend along the Y-axis. The second short side wall 523 and the end side wall 524 are arranged along the X-direction. The second connection portion 52 includes an engagement window 525. The engagement window 525 is a hole defined by the first and second long side walls 521, the second short side wall 523, and the end side wall 524.

Since the three terminal holders 60 have the same structure, one of the terminal holders 60 will now be described. The terminal holder 60 includes a groove-like portion that is open in the X-direction. The groove-like portion includes a first wall 61, a second wall 62, and a third wall 63. The first wall 61 and the second wall 62 are opposed to each other in the Z-direction. The third wall 63 connects the proximal ends of the first wall 61 and the second wall 62 to each other. The long sides of the first wall 61, the second wall 62, and the third wall 63 extend along the Y-axis. The short sides of the first wall 61 and the short sides of the second wall 62 extend along the X-axis. The short sides of the third wall 63 extend along the Z-axis.

The terminal holder 60 includes a fourth wall 64 and a fifth wall 65. The fourth wall 64 has the shape of a rectangular flat plate that closes a first end in the Y-direction of the groove-like portion (the first to third walls 61 to 63). The fifth wall 65 has the shape of a rectangular flat plate that closes a second end in the Y-direction of the groove-like portion (the first to third walls 61 to 63). The fourth wall 64 and the fifth wall 65 are opposed to each other in the Y-direction. Accordingly, the terminal holder 60 has the shape of a substantially rectangular parallelepiped having an opening. The terminal holder 60 includes a holding portion 66, which includes a space surrounded by the first to fifth walls 61 to 65. The terminal holder 60 includes an opening 66a, through which the connection terminal 50 is inserted into the holding portion 66. The opening 66a opens along the X-axis to the side opposite from the third wall 63.

The first wall 61 and the second wall 62 respectively have removal portions 61a and 62a between the fifth wall 65 and the center in the Y-direction. The removal portions 61a, 62a are cutouts that open in the same direction as the opening 66a. The removal portions 61a and 62a respectively extend in the Z-direction through the first wall 61 and the second wall 62.

The second wall 62 has a relief portion 62c between the fourth wall 64 and the center in the Y-direction. The relief portion 62c extends in the Z-direction through the second wall 62.

The third wall 63 includes a second conductor receiving hole 67, which extends in the X-direction through the third wall 63. The second end of the conductor 32 is connected to the inside of the second connection portion 52 (the rectangular frame) through the second conductor receiving hole 67. The third wall 63 includes a beam forming window 63a, which is rectangular and extends along the Y-axis. The beam forming window 63a extends in the X-direction through the third wall 63. A first end in the Y-direction of the beam forming window 63a is continuous with the second conductor receiving hole 67. A second end in the Y-direction of the beam forming window 63a is located at a position separated from the fifth wall 65. The third wall 63 includes a beam 63b, which extends from the second end of the beam forming window 63a toward the second conductor receiving hole 67. The distal end face of the beam 63b defines a part of the second conductor receiving hole 67. The beam 63b has a hook 63c at the distal end. The hook 63c extends outward from the holding portion 66 along the X-axis. The hook 63c protrudes further than the outer surface of the third wall 63. The hook 63c defines a part of the second conductor receiving hole 67. The beam 63b can be displaced along the X-axis in the beam forming window 63a.

The third wall 63 includes a third wall slit 63d between the second conductor receiving hole 67 and the fourth wall 64. The third wall slit 63d extends in the X-direction through the third wall slit 63d.

The fourth wall 64 includes a protrusion 64a, which protrudes into the holding portion 66 toward the fifth wall 65. The protrusion 64a is located at a position separated in the X-direction from the third wall 63. The fourth wall 64 has a fourth wall slit 64b between the protrusion 64a and the third wall 63 in the X-direction. The fourth wall slit 64b extends in the Y-direction through the fourth wall slit 64b. The terminal holder 60 includes a positioning hole 68. The positioning hole 68 is defined by the third wall slit 63d and the fourth wall slit 64b, which are continuous with each other.

The fifth wall 65 includes a substantially circular cutout (receiving recess) 69, which extends in the Y-direction through the fifth wall 65. The cutout 69 is located closer to the opening 66a than the center in the X-direction. The cutout 69 is continuous with the holding portion 66. The fifth wall 65 includes a side end face 65a, in which the cutout 69 opens. The side end face 65a is an end face in the X-direction. The cutout 69 opens in a direction away from the third wall 63. The cutout 69 opens in the same direction as the opening 66a of the holding portion 66.

Figure 4:
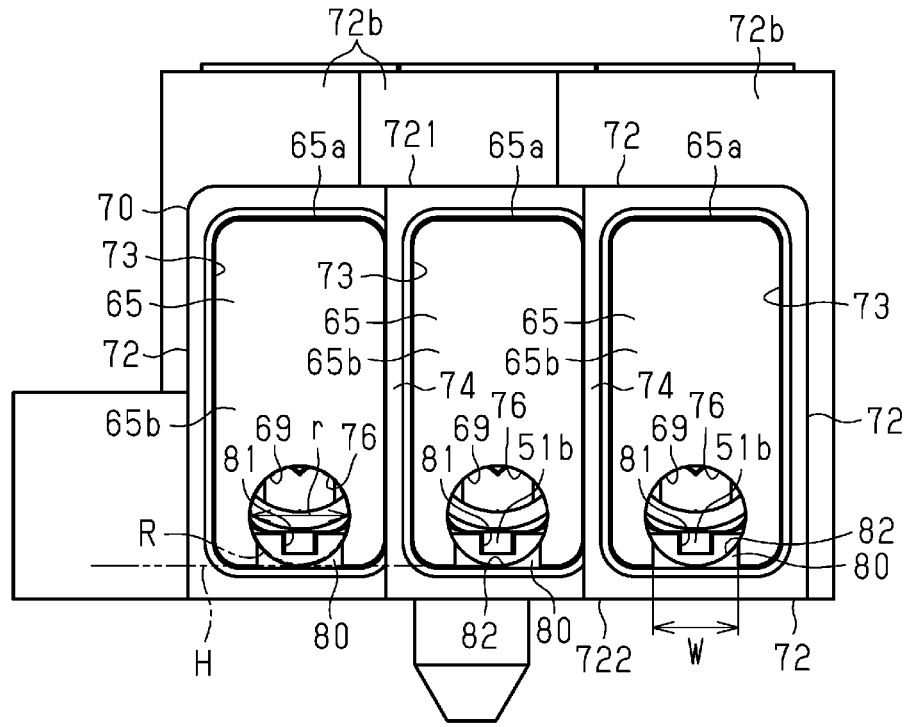
FIG. 4 is a front view of the connector of FIG. 2, as seen from the side of the openings of the cluster block.

FIG. 4 shows an imaginary circle R that conforms to the cutout 69. The diameter of the imaginary circle R is represented by r. The cutout 69 opens in the side end face 65a of the fifth wall 65. An imaginary plane that includes the side end face 65a is represented by H. A point on the imaginary circle R is located on the imaginary plane H. The diameter r is equal to or slightly greater than an outer diameter F of the tube 28 shown in FIG. 6.

As shown in FIG. 4, the dimension along the Z-axis of the cutout 69, which opens in the side end face 65a, that is, an opening width W, is smaller than the diameter r and slightly smaller than the outer diameter F of the tube 28. The tube 28 can be received by the cutout 69 through the opening in the side end face 65a.

Figure 7:
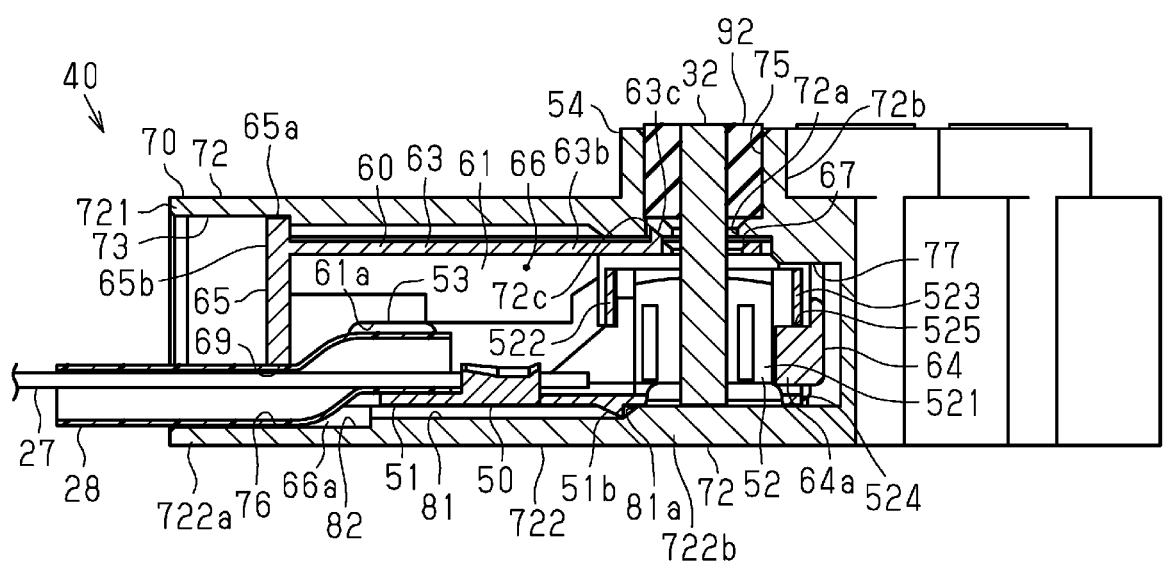
FIG. 7 is a cross-sectional view of the connector of FIG. 2.
Figure 8:
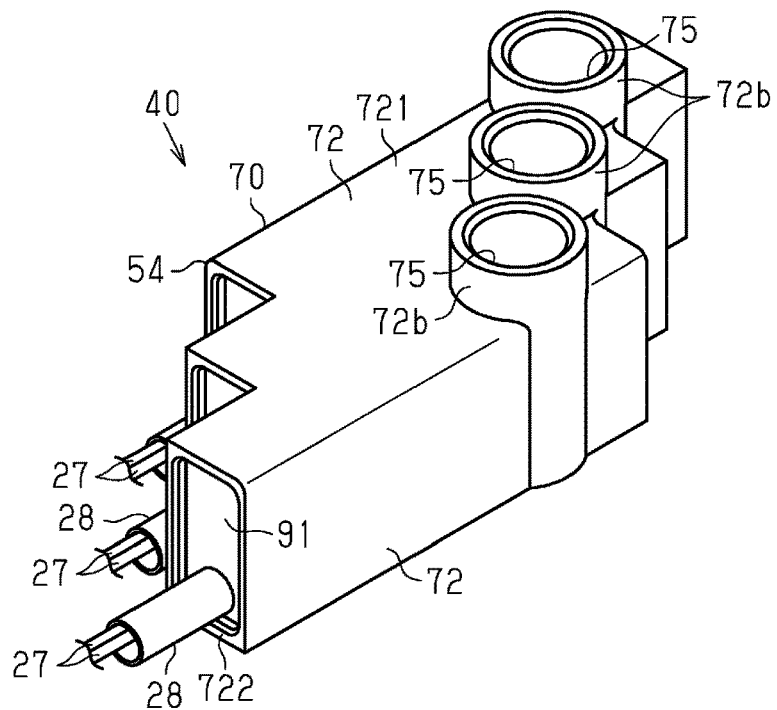
FIG. 8 is a perspective view of the connector of FIG. 2.

As shown in FIGS. 2 and 7, the first connection portion 51 is held between the first wall 61 and the second wall 62. The first long side wall 521 is exposed to the outside of the terminal holder 60 through the relief portion 62c of the second wall 62, and the second long side wall 521 is arranged along the inner surface of the first wall 61. The crimp portion 53 is exposed to the outside of the terminal holders 60 through the removal portions 61a, 62a.

The first and second long side walls 521, the first short side wall 522, and the second short side wall 523 define a peripheral wall, which is arranged side by side with the second conductor receiving hole 67 along the X-axis. The protrusion 64a of the fourth wall 64 extends through the engagement window 525. Thus, the protrusion 64a is engaged with the engagement window 525 when the connection terminal 50 is moved in the X-direction relative to the terminal holder 60. This limits a further movement in the X-direction of the connection terminal 50.

Figure 6:
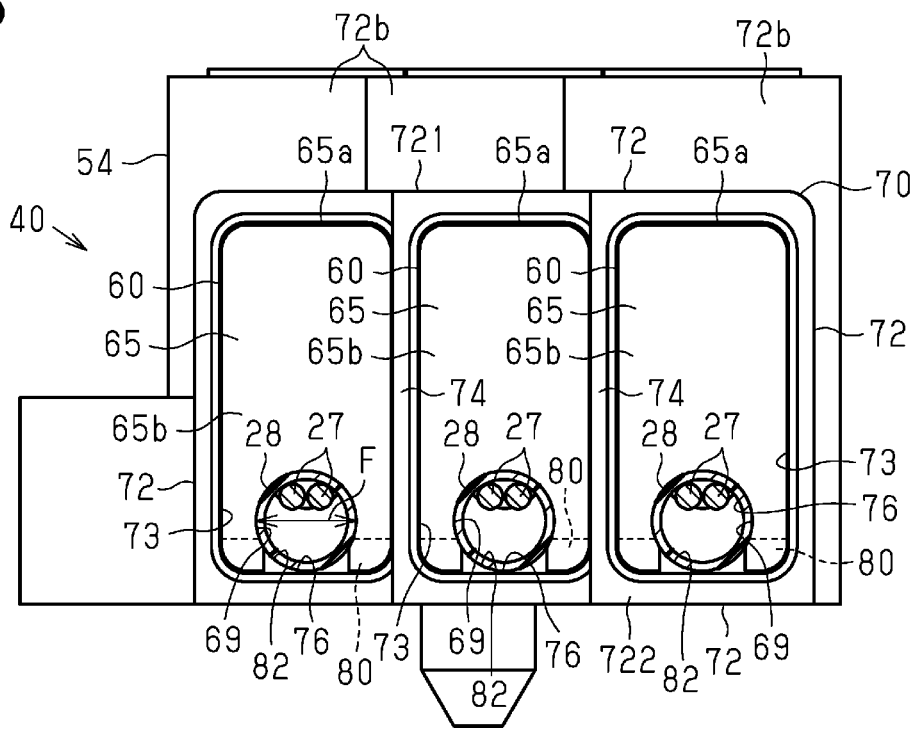
FIG. 6 is a diagram illustrating a state in which the outer circumferential surface of each tube conforms to the inner surface of a corresponding tube receiving hole.

As shown in FIG. 6, the two motor wires 27 are received by the cutout 69 together with the tube 28. The outer circumferential surface of the tube 28 conforms to the cutout 69. A part of the tube 28 in the circumferential direction is located on the imaginary plane H.

As shown in FIG. 2, the cluster block 70 has a step-shaped end wall 71 at the proximal end in the Y-direction. The cluster block 70 has four outer walls (side walls) that intersect with the edge of the end wall 71. The cluster block 70 also has a step-shaped distal end similar to the proximal end. The cluster block 70 has three accommodation holes 73. The accommodation holes 73 are openings of the cluster block 70. Each terminal holder 60 is accommodated in the corresponding accommodation hole 73. The three accommodation holes 73 are arranged in the Z-axis. The positions along the Y-axis of the three accommodation holes 73 are displaced from each other in a stepwise manner.

Each adjacent pair of the accommodation holes 73 are separated from each other by a partition wall 74. The accommodation holes 73 are defined by the end wall 71, outer walls 72, and the partition walls 74. In each accommodation hole 73, the dimension along the Z-axis is smaller than the dimension along the X-axis and the dimension along the Y-axis.

Since the three accommodation holes 73 have the same structure, one of the accommodation holes 73 will now be described. The accommodation hole 73 has an elongated shape with an axis extending along the Y-axis from the end wall 71. The accommodation hole 73 opens at the end opposite from the end wall 71, that is, at the distal end of the cluster block 70. The opening is rectangular.

The four outer walls 72 include two outer walls 72 that intersect with the Z-axis, a first outer wall 721, and a second outer wall 722. The first and second outer walls 721, 722 intersect with the X-axis. The first outer wall 721 and the second outer wall 722 each have a greater area than the two outer walls 72 that intersect with the Z-axis.

As shown in FIG. 5, the cluster block 70 includes three through-holes 72a, which extend through the first outer wall 721, and three cylindrical guide portions 72b, which protrude outward from the first outer wall 721. The through-holes 72a and the guide portions 72b are located closer to the proximal end (the end wall 71) than to the distal end of the cluster block 70. The first outer wall 721 has an engagement groove 72c in each through-hole 72a at a position farthest from the end wall 71. The engagement groove 72c is provided in a part in the circumferential direction of the through-hole 72a, and may be a recess along the Y-axis or a cutout. The cluster block 70 includes positioning protrusions 77, which protrude along the X-axis from parts of the inner surface of the first outer wall 721 toward the second outer wall 722.

The space in each guide portion 72b is continuous with the corresponding through-hole 72a. The inner diameter of the guide portion 72b is greater than the inner diameter of the through-hole 72a. Each through-hole 72a is continuous with the corresponding accommodation hole 73 via the second conductor receiving hole 67. The second end of each conductor 32 is inserted into the inside of the rectangular frame of the corresponding second connection portion 52 through the corresponding set of the guide portion 72b, the through-hole 72a, and the second conductor receiving hole 67. The inner circumferential surface of the guide portion 72b and the through-hole 72a define a first conductor receiving hole 75, which receives the conductor 32. As such, the cluster block 70 has three first conductor receiving holes 75. The direction in which the conductors 32 are inserted into the first conductor receiving holes 75 is an insertion direction (first direction). Each engagement groove 72c is recessed from a part of the inner peripheral surface of the corresponding receiving hole 75.

As shown in FIGS. 2 and 5, the cluster block 70 includes three base portions 722b, which protrude from the inner surface of the second outer wall 722. More specifically, the second outer wall 722 includes opening defining portions 722a, which define the openings of the cluster block 70, and base portions 722b, which have a thickness greater than that of the opening defining portions 722a. Each base portion 722b defines a part of the corresponding accommodation hole 73. The dimension along the X-axis (thickness) of the second outer wall 722 changes in a stepwise manner along the Y-axis. Each base portion 722b defines a space that is continuous with an opening of the cluster block 70 in the cluster block 70.

The second outer wall 722 has step surfaces 80, each of which is located at the boundary between an opening defining portion 722a and the corresponding base portion 722b. The step surface 80 is orthogonal to the opening defining portion 722a and the base portion 722b. The opening defining portion 722a and the base portion 722b are opposed to the first outer wall 721 in the X-direction.

The base portion 722b has a guide recess 82, which opens to the step surface 80, at a position adjacent to the opening defining portion 722a. The opening of the guide recess 82 to the step surface 80 is arcuate, and the opening of the guide recess 82 in a plan view is rectangular. When the inside of the cluster block 70 is seen through the opening of an accommodation hole 73, the surface of the guide recess 82 overlaps with the imaginary circle R, and the most recessed part of the guide recess 82 is located on the imaginary plane H. The surface of the guide recess 82 conforms to a part of the outer circumferential surface of the tube 28, so that the guide recess 82 can guide the tube 28.

The base portion 722b includes a groove 81, which extends from the guide recess 82 toward the end wall 71. The proximal end of the groove 81 is continuous with the internal space of the guide recess 82. The cluster block 70 has a catch surface 81a at the distal end face of each groove 81.

The dimension along the Y-axis of the opening of each accommodation hole 73 is slightly greater than the dimension along the Y-axis of the fifth wall 65, and the dimension along the Z-axis of the opening of each accommodation hole 73 is slightly greater than the dimension along the Z-axis of the fifth wall 65. Each terminal holder 60 is inserted into the corresponding accommodation hole 73 along the Y-axis.

As shown in FIG. 7, the three terminal holders 60 are accommodated in the cluster block 70. In this state, the fourth wall 64 is located close to the end wall 71, and the fifth wall 65 is located in the vicinity of the opening of the accommodation holes 73, specifically, at a position adjacent to the opening defining portion 722a. The first connection portion 51 and the second connection portion 52 are supported by the base portion 722b. In the cluster block 70, the tube 28, which is located on the base portion 722b, is engaged with the groove 81 and the guide recess 82. The hook portion 51b of each connection terminal 50 is accommodated in the corresponding groove 81. At this time, the hook portion 51b is opposed to the catch surface 81a in the Y-direction. Thus, when the terminal holder 60 starts moving toward the end wall 71, the hook portion 51b is engaged with the catch surface 81a, so that a further movement of the terminal holders 60 is restricted. Each fourth wall 64 is opposed to the corresponding end wall 71 in the cluster block 70. Each fourth wall 64 is separated from the end wall 71.

The third wall 63 of the terminal holder 60 is opposed to the first outer wall 721, which defines the first conductor receiving hole 75. The second conductor receiving hole 67 in the third wall 63 is continuous with the first conductor receiving hole 75. Thus, the third wall 63 is a wall disposed between the first conductor receiving hole 75 and the connection terminal 50 and has the second conductor receiving hole 67.

The hook 63c of the third wall 63 is accommodated in the engagement groove 72c of the cluster block 70. Thus, when the terminal holder 60 starts moving toward the opening of the accommodation hole 73, the hook 63c is engaged with the engagement groove 72c, so that a further movement of the terminal holders 60 is restricted.

The positioning hole 68 accommodates the positioning protrusion 77 of the cluster block 70. The distal end in the X-direction of the positioning protrusion 77 is opposed to the second short side wall 523 of the connection terminal 50. Thus, when the connection terminal 50 starts moving toward the third wall 63, the positioning protrusion 77 is engaged with the second short side wall 523, so that a further movement of the connection terminal 50 is restricted.

As shown in FIG. 6, the fifth wall 65 is fitted in the accommodation hole 73 to close the opening of the accommodation hole 73. That is, when the terminal holder 60 is accommodated in the cluster block 70, the fifth wall 65 closes the corresponding opening. In other words, the fifth wall 65 of the terminal holder 60 is a lid that closes the opening of the cluster block 70. The fifth wall 65 contacts the step surface 80 of the base portion 722b. Accordingly, the base portion 722b closes a part of the hole that is defined by the cutout 69. As such, the fifth wall 65 has the cutout 69, which receives the tube 28.

A tube receiving hole 76 is defined between the cutout 69 and the opening defining portion 722a. That is, the cutout 69 and the guide recess 82, which are arranged in the Y-direction, define the shape of a hole that conforms to the outer circumferential surface of the tube 28. When the tube receiving hole 76 is seen from the opening of the accommodation hole 73, a part of the tube receiving hole 76 is closed by the base portion 722b. The cutout 69 and the guide recess 82 have contours that conform to the outer circumferential surface of the tube 28.

Specifically, most of the outer circumferential surface of the tube 28 except for the part opposed to the opening defining portion 722a conforms to the cutout 69, and the part opposed to the opening defining portion 722a conforms to the opening defining portion 722a. The step surface 80 is arranged at a position in the cutout 69 that is closer to the end wall 71 than the opening in the side end face 65a. The step surface 80 closes a part of the cutout 69 and restricts movement of the fifth wall 65. Accordingly, the fifth wall 65 and the second outer wall 722 seal the gap between the outer circumferential surface of the tube 28 and the inner surface of the cluster block 70.

An end face 65b of the fifth wall 65 is arranged at a position closer to the end wall 71 than the distal end face of the outer wall 72 in the Y-direction. A first seal member 91 is arranged in the space surrounded by the outer wall 72, the partition wall 74, and the end face 65b. The first seal member 91 is, for example, a resin adhesive. The terminal holder 60 and the cluster block 70 are bonded to each other by the first seal member 91. The gap between the outer wall 72 and the fifth wall 65, the gap between the partition wall 74 and the fifth wall 65, and the gap between the cutout 69 and the tube 28 are sealed by the first seal member 91.

As shown in FIG. 7, a second seal member 92 is provided in the gap between the inner circumferential surface of the guide portion 72b and the conductor 32. The second seal member 92 is, for example, a tubular rubber plug. The gap between the inner circumferential surface of the guide portion 72b and the conductor 32 is sealed by the second seal member 92.

The method of assembling the connector 40 will now be described together with the operation.

First, two motor wires 27 are connected to each first connection portion 51. This electrically connects the connection terminal 50 to the motor wires 27. Also, the first end of the tube 28 is crimped with the motor wires 27 inside, so that the crimp portion 53 is formed.

Figure 9:
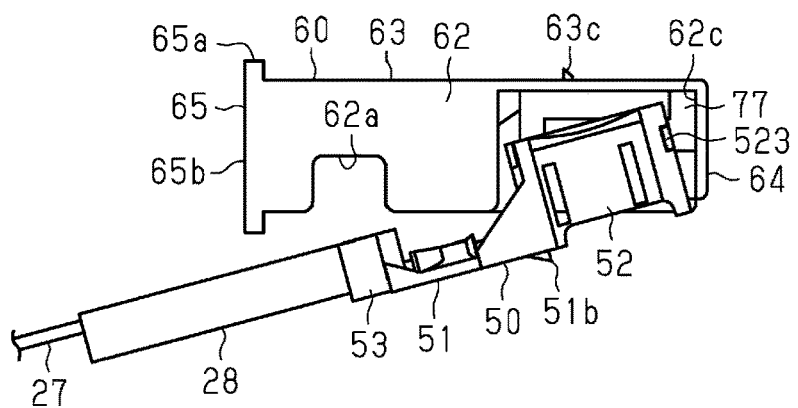
FIG. 9 is a diagram illustrating a method for attaching a connection terminal to a terminal holder.
Figure 10:
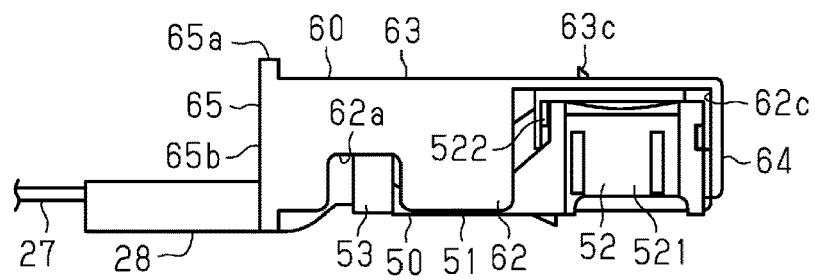
FIG. 10 is a diagram illustrating a state in which the connection terminal is attached to the terminal holder.

Next, as shown in FIGS. 9 and 10, the connection terminal 50 is inserted into the holding portion 66 from the opening 66a, and the tube 28 is inserted into the cutout 69. At this time, the second connection portion 52 is inserted into the holding portion 66 before the first connection portion 51.

The protrusion 64a of the fourth wall 64 is inserted into the engagement window 52s. Thereafter, the first connection portion 51 is inserted into the holding portion 66, and the tube 28 is inserted into the cutout 69. Accordingly, the connection terminal 50 is held by the terminal holder 60 through the cutout 69, so that the tube 28 is received by the cutout 69. The second conductor receiving hole 67 is continuous with the inside of the rectangular frame of the second connection portion 52.

Next, the terminal holder 60, which holds the connection terminal 50, is inserted into the cluster block 70. More specifically, the terminal holder 60 is inserted into the accommodation hole 73 with a part of the outer circumferential surface of the tube 28 conforming to the cutout 69. Accordingly, the opening of the cutout 69 is closed by the opening defining portion 722a, and the tube receiving hole 76 is formed. That is, the cutout 69 and the guide recess 82 are aligned in the Y-direction to form the tube receiving hole 76, which conforms to the outer circumferential surface of the tube 28. Also, the step surface 80 contacts the fifth wall 65, such that a part of the cutout 69 is closed by the base portion 722b. This ensures the sealing performance at the outer circumferential surface of the tube 28.

Therefore, the terminal holders 60 does not need to be press-fitted into the accommodation hole 73 to ensure the sealing performance at the outer circumferential surface of the tube 28.

When the terminal holder 60 is inserted into the cluster block 70, the hook portion 51b of the connection terminal 50 is inserted into the groove 81 from the guide recess 82. Also, when the terminal holder 60 is being inserted into the accommodation hole 73, the beam 63b of the third wall 63 is pressed toward the second connection portion 52 by the first outer wall 721 of the cluster block 70. When the fifth wall 65 contacts the step surface 80, the hook 63c is opposed to the engagement groove 72c, so that the beam 63b returns to the original shape from the pressed state. Accordingly, the hook 63c is accommodated in the engagement groove 72c. Also, the hook portion 51b of the connection terminal 50 is opposed to the catch surface 81a of the groove 81.

The second conductor receiving hole 67 and the inside of the rectangular frame of the second connection portion 52 are continuous with the first conductor receiving holes 75. Further, the fifth wall 65 is fitted to the opening defining portion 722a in the accommodation hole 73 so as to close the opening of the accommodation hole 73.

Next, the space surrounded by the opening of the accommodation hole 73 and the end face 65b of the fifth wall 65 is filled with an adhesive to provide the first seal member 91. The second end of the conductor 32, to which the second seal member 92 is attached in advance, is inserted into the rectangular frame of the second connection portion 52 through the first conductor receiving hole 75 and the second conductor receiving hole 67, and the second seal member 92 is inserted into the guide portion 72b. This electrically connects the connection terminal 50 to the conductor 32.

In the motor-driven compressor 10 having the above-described configuration, the motor drive circuit 20 supplies power to the electric motor 18 via the conductors 32, the connection terminals 50, and the motor wires 27. This drives the electric motor 18, so that the rotary shaft 16 rotates. This drives the compressing unit 17, which in turn compresses refrigerant.

Although the refrigerant, which contains lubricant, flows through the housing 11, the first seal members 91 restrict entry of the refrigerant containing lubricant into the cluster block 70 through the accommodation holes 73.

The present embodiment has the following advantages.

(1) When the fifth wall 65 contacts the base portion 722b, the base portion 722b closes a part of the cutout 69. This ensures the sealing performance at the outer circumferential surface of the tube 28 received by the cutout 69. Therefore, refrigerant is unlikely to enter the accommodation hole 73 through the gap between the cutout 69 and the tube 28, so that the sealing performance at the outer circumferential surface of the tube 28 is ensured.

(2) The terminal holder 60 is inserted into the accommodation hole 73 of the cluster block 70 with a part of the outer circumferential surface of the tube 28 conforming to the cutout 69. When the terminal holder 60 is inserted into the accommodation hole 73, the tube 28 is inserted into the accommodation hole 73. Therefore, the terminal holders 60 does not need to be press-fitted into the accommodation hole 73 to ensure the sealing performance at the outer circumferential surface of the tube 28. This facilitates the process of ensuring the sealing performance of the tube 28. Since the terminal holder 60 does not need to be press-fitted into the accommodation hole 73, the terminal holder 60 is prevented from being deformed or displaced due to press-fitting process. This prevents the sealing performance from being reduced due to deformation and displacement of the terminal holder 60.

(3) The space surrounded by the opening of the accommodation hole 73 and the end face 65b of the fifth wall 65 is filled with the first seal member 91. The first seal member 91 seals the gap between the opening of the accommodation hole 73 and the outer edge of the fifth wall 65, and the inside of the cutout 69. This limits entry of refrigerant containing lubricant into the cluster block 70 through the gap between the opening of the accommodation hole 73 and the fifth wall 65, and the cutout 69. This further improves the insulation between the connection terminal 50 and the motor housing member 12.

(4) The sealing performance at the outer circumferential surface of the tube 28, which is received by the cutout 69, is ensured by bringing the base portion 722b into contact with the fifth wall 65 to close a part of the cutout 69 with the base portion 722b. Thus, the adhesive used to form the first seal member 91 is prevented from entering the cluster block 70 through the region around the tube 28. As a result, the adhesive is prevented from entering the joint between the connection terminal 50 and the conductor 32. Thus, insertion of the conductor 32 into the second connection portion 52 is not hindered by cured adhesive.

(5) The third wall 63 of the terminal holder 60 includes the hook 63c. The hook 63c is engageable with the engagement groove 72c. Thus, when the terminal holder 60 starts moving toward the opening of the accommodation hole 73, the hook 63c is engaged with the engagement groove 72c. This restricts movement of the terminal holder 60 relative to the cluster block 70. This restricts movement of the connection terminal 50 held by the terminal holder 60 toward the opening of the accommodation hole 73. This allows the conductor 32 to be easily connected to the connection terminal 50.

(6) The protrusion 64a of the fourth wall 64 is inserted into the engagement window 525 of the second connection portion 52. The protrusion 64a restricts movement in the X-direction and along the Z-axis of the connection terminal 50 relative to the terminal holder 60. The connection terminal 50 is thus prevented from falling off the terminal holder 60.

(7) The positioning protrusion 77 of the cluster block 70 is inserted into the positioning hole 68 of the terminal holder 60. The positioning protrusion 77 restricts movement along the X-axis of the connection terminal 50 toward the third wall 63. The connection terminal 50 is thus prevented from falling off the terminal holder 60.

(8) Since the base portion 722b is provided with the guide recess 82, the tube 28 can be guided along the base portion 722b. This allows the tube 28 to conform to the inner surface of the cluster block 70.

(9) The motor wires 27 are passed through the tube 28. The tube 28 has a greater diameter than the motor wire 27. The size of the cutout 69, which receives the tube 28, is greater than that in a case in which the cutout 69 receives only the motor wires 27. Even though the cutout 69 has a large opening, a part of the cutout 69 is closed by the base portion 722b. This prevents a large gap from being formed on the outer side of the tube 28.

(10) Since the positioning protrusion 77 of the cluster block 70 is engaged with the connection terminal 50, movement along the X-axis of the connection terminal 50 toward the third wall 63 is restricted. For example, in order to restrict movement of the connection terminal 50 together with the terminal holder 60 by causing the distal end of the positioning protrusion 77 to contact the outer surface of the third wall 63, the position of the distal end of the positioning protrusion 77 needs to aligned with the outer surface of the third wall 63. However, the position of the third wall 63 varies depending on the manufacturing tolerances of the dimensions of the accommodated connection terminal 50. The position of the outer surface of the third wall 63 varies significantly because of accumulated manufacturing tolerances of the terminal holder 60 and the connection terminal 50. Accordingly, the size of the cluster block 70 needs to be increased to cause the positioning protrusion 77 to contact the outer surface of the third wall 63. In this regard, the terminal holder 60 of the present embodiment includes the positioning hole 68, so that the positioning protrusion 77, which is received by the positioning hole 68, directly contacts the connection terminal 50. Thus, there is no need to factor in the dimensions including manufacturing tolerances of the terminal holder 60. This allows movement of the connection terminal 50 to be restricted without increasing the size of the cluster block 70.

The present embodiment may be modified as follows. The present embodiment and the following modifications can be combined as long as the combined modifications remain technically consistent with each other.

The shape of the cluster block 70 may be changed. For example, the end wall 71 and the distal end face of the outer wall 72 do not necessarily need to be step-shaped, but may be each provided in a flat plane.

The positions of the accommodation holes 73 in the cluster block 70 may be changed. For example, the accommodation holes 73 may be arranged in a straight line along the Z-axis when seen from the openings of the cluster block 70.

The number of phases of the coils 26 may be changed.

The number of the leads forming each coil 26 may be one or greater than two.

The number of the terminal holders 60 and the number of the accommodation holes 73 may be changed in accordance with the number of phases of the coils 26.

The number of the first conductor receiving holes 75 may be changed in accordance with the number of phases of the coils 26.

The configuration that restricts movement of the terminal holders 60 relative to the cluster block 70 toward the openings of the accommodation holes 73 may be changed.

The configuration that restricts movement of the connection terminals 50 relative to the terminal holders 60 may be changed.

The compressing unit 17 is not limited to a type that includes the stationary scroll 17a and the movable scroll 17b, but may be a piston type or a vane type.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A motor-driven compressor, comprising:
   a compressor configured to compress a refrigerant;
   an electric motor configured to drive the compressor;
   a motor drive circuit configured to drive the electric motor;
   a plurality of motor wires electrically connected to the electric motor, the motor wires including portions covered with an insulating tube and distal ends at which a connection terminal is provided, the connection terminal being electrically connected to the motor drive circuit;

an insulating terminal container; and a housing that accommodates the compressor, the electric motor, and the insulating terminal container, wherein the insulating terminal container includes:
  a cluster block that accommodates the connection terminal and has an opening that opens to an outside, and
  a terminal holder that holds the connection terminal, the terminal holder having a lid that closes the opening, the cluster block includes a base portion, the base portion having a guide recess arranged to guide the insulating tube, the base portion defines a space that is continuous with the opening in the cluster block, the lid includes a cutout that receives the insulating tube, and the lid is in contact with the base portion such that a part of a hole defined by the cutout is closed by the base portion, the cluster block includes:
  a first conductor receiving hole, which receives a conductor that is electrically connected to the motor drive circuit, and
  an engagement groove, which is recessed from a part of an inner peripheral surface of the first conductor receiving hole, and the terminal holder includes:
    a wall arranged between the first conductor receiving hole and the connection terminal, the wall including a second conductor receiving hole that receives the conductor, and
    a hook that defines a part in a circumferential direction of the second conductor receiving hole, the hook being arranged to be engaged with the engagement groove when the terminal holder starts moving toward the opening of the cluster block.

2. The motor-driven compressor according to claim 1, wherein
  a direction in which the conductor is inserted into the second conductor receiving hole is an insertion direction,
  the terminal holder includes a positioning hole, which extends in the insertion direction through the wall, and
  the cluster block includes a positioning protrusion, the positioning protrusion protruding in the insertion direction so as to be arranged in the positioning hole, and the positioning protrusion being arranged to be engaged with the connection terminal when the connection terminal starts moving toward the wall.

3. The motor-driven compressor according to claim 1, wherein a resin seal is arranged at the opening of the cluster block, the resin seal sealing the opening on an outer side of the lid.

4. The motor-driven compressor according to claim 1, wherein the terminal holder, which holds the connection terminal, is configured to be accommodated in the cluster block through the opening.

5. A motor-driven compressor, comprising:
  a compressor configured to compress a refrigerant;
  an electric motor configured to drive the compressor;
  a motor drive circuit configured to drive the electric motor;
  a plurality of motor wires electrically connected to the electric motor, the motor wires including portions covered with an insulating tube and distal ends at which a connection terminal is provided, the connection terminal being electrically connected to the motor drive circuit;

an insulating terminal container; and a housing that accommodates the compressor, the electric motor, and the insulating terminal container, wherein the insulating terminal container includes:
  a cluster block that accommodates the connection terminal, and
  a terminal holder that holds the connection terminal, the cluster block includes:
  an accommodation hole that accommodates the terminal holder,
  a base portion, the base portion having a guide recess arranged to guide the insulating tube, and
  an outer wall opposed to the base portion, the terminal holder is located between the outer wall and the base portion, the outer wall includes a first conductor receiving hole, which receives a conductor, the accommodation hole includes an opening that opens to an outside to receive the terminal holder, the base portion defines a space that is continuous with the opening in the cluster block, the terminal holder has a shape of a substantially rectangular parallelepiped having a terminal holder opening, which opens to the base portion, the terminal holder includes:
  a lid that closes the opening when the terminal holder is accommodated in the cluster block,
  a holding portion that holds the connection terminal, and
  a second conductor receiving hole, which receives the conductor, the connection terminal is located between the second conductor receiving hole and the base portion, the lid includes a cutout that receives the insulating tube, and the lid is in contact with the base portion such that a part of a hole defined by the cutout is closed by the base portion.

6. The motor-driven compressor according to claim 5, wherein the conductor is electrically connected to the motor drive circuit,
  the cluster block includes:
    an engagement groove, which is recessed from a part of an inner peripheral surface of the first conductor receiving hole, and the terminal holder includes:
      a wall arranged between the first conductor receiving hole and the connection terminal, the wall including the second conductor receiving hole, and
      a hook that defines a part in a circumferential direction of the second conductor receiving hole, the hook being arranged to be engaged with the engagement groove when the terminal holder starts moving toward the opening of the cluster block.

7. The motor-driven compressor according to claim 6, wherein
  a direction in which the conductor is inserted into the second conductor receiving hole is an insertion direction,
  the terminal holder includes a positioning hole, which extends in the insertion direction through the wall, and
  the cluster block includes a positioning protrusion, the positioning protrusion protruding in the insertion direction so as to be arranged in the positioning hole, and the positioning protrusion being arranged to be engaged with the connection terminal when the connection terminal starts moving toward the wall.

8. The motor-driven compressor according to claim 5, wherein a resin seal is arranged at the opening of the cluster block, the resin seal sealing the opening on an outer side of the lid.

9. The motor-driven compressor according to claim 5, wherein the terminal holder, which holds the connection terminal, is configured to be accommodated in the cluster block through the opening.

* * * * *